United States Patent [19]

Bias et al.

[11] Patent Number: 5,313,997

[45] Date of Patent: May 24, 1994

[54] TIRE VALVE STEM STABILIZING AND SUPPORTING DEVICE

[75] Inventors: Donald R. Bias, Columbia Station, Ohio;

[73] Assignee: Aluminum Company of America, Pittsburgh, Pa.

[21] Appl. No.: 974,913

[22] Filed: Nov. 12, 1992

[51] Int. Cl.⁵ .................... B60C 29/02; F16L 5/02
[52] U.S. Cl. ............................. 152/427; 248/57; 16/2; 403/197; 403/372
[58] Field of Search ............ 152/427; 248/75, 56, 248/57; 16/2; 403/365, 203, 372, 197; 301/5, 24

[56] References Cited

U.S. PATENT DOCUMENTS

| | | |
|---|---|---|
| 1,693,859 | 12/1928 | Nelson . |
| 1,697,814 | 1/1929 | Forbes ................................. 16/2 |
| 1,931,649 | 10/1933 | Eger ................................. 152/427 |
| 1,934,972 | 11/1933 | Frank ................................ 152/427 |
| 1,971,604 | 8/1934 | Frank ................................ 301/36 |
| 2,812,000 | 11/1957 | Trinca ............................... 152/427 |
| 3,033,263 | 5/1962 | Greco ............................... 152/427 |
| 3,087,529 | 4/1963 | Morton .......................... 152/427 X |
| 3,511,295 | 5/1970 | Kilmarx ............................ 152/427 |
| 3,542,109 | 11/1970 | Stroh ................................. 152/427 |
| 4,427,237 | 1/1984 | Beegle ................................ 301/13 |
| 4,724,880 | 2/1988 | Voornas ............................. 152/427 |

FOREIGN PATENT DOCUMENTS 823722 11/1959 United Kingdom .

*Primary Examiner*—Michael W. Ball
*Assistant Examiner*—Francis J. Lorin
*Attorney, Agent, or Firm*—David V. Radack; David W. Brownlee; Gary P. Topolosky

[57] ABSTRACT

A tire valve stem stabilizing and supporting device that is used with a valve stem of an inner tire mounted on a dual wheel, the dual wheel having an access opening through which the valve stem passes. The device has a passageway through which the valve stem passes and is adapted to being removably secured in the access opening. In this way, the valve stem is stabilized and supported in the access opening. An associated kit, dual wheel system and method are also provided.

21 Claims, 2 Drawing Sheets

TIRE VALVE STEM STABILIZING AND SUPPORTING DEVICE

BACKGROUND OF THE INVENTION

This invention relates to a tire valve stem stabilizing and supporting device that is used in association with a tire valve stem of an inner tire which is mounted on a dual wheel system. The invention also includes a tire valve stem stabilizer and extender kit, a dual wheel system and an associated method.

Dual wheels adapted to support two tires are in widespread use on trucks and other vehicles. The inner tire mounted on the dual wheel may include an integral elongated valve stem or a valve stem and an elongated valve stem extender both of which are used to introduce air pressure into the inner tube of the inner tire. The elongated valve stem passes through an access opening in the dual wheel and extends outwardly from the dual wheel system enabling the operator to add or check air pressure in the inner tire.

In use, the elongated valve stem or the elongated valve stem extender is subject to numerous vibrations and shocks as the vehicle with which it is associated travels over the road. During these vibrations and shocks, the elongated valve stem or valve stem extender can forcibly contact the dual wheel, resulting in damage and even breakage thereof. A broken valve stem is a safety hazard that must be quickly repaired. Furthermore, the cost in time and money of repairing the valve stem adds to the operating expense of the vehicle.

Thus, there is a need for a tire valve stem stabilizer for use on an inner tire valve stem of a dual wheel system.

SUMMARY OF THE INVENTION

The invention has met the above-described need. The tire valve stem stabilizing and supporting device is used with an elongated valve stem of an inner tire mounted on a dual wheel, the dual wheel having an access opening through which the elongated valve stem passes. The device has a passageway through which the elongated valve stem passes and is adapted to being removably secured in the access opening. In this way, the elongated valve stem is stabilized and supported in the access opening.

The invention further includes a tire valve stem extender and stabilizer kit for use with a valve stem of an inner tire mounted on a dual wheel, the dual wheel having an access opening. The kit comprises an elongated extender having an end portion adapted for engagement with the inner tire valve stem and further adapted for insertion at least partially through the access opening, and a stabilizer which has a passageway in which the elongated extender is adapted to be inserted. The stabilizer is adapted to be removably secured in the access opening. In this way, the elongated extender is stabilized and supported in the access opening.

The invention also includes a dual wheel system including a dual wheel having an access opening, an outer tire mounted on the dual wheel and an inner tire mounted on the dual wheel. The inner tire includes an elongated valve stem adapted for insertion at least partially through the access opening. A stabilizer is disposed in the access opening, the stabilizer defining a passageway through which the elongated valve stem is inserted. The stabilizer is adapted to be removably secured in the access opening.

Finally, the invention includes a method of providing access to a valve of an inner tire mounted on a dual wheel system including a dual wheel defining an access opening. The method comprises providing a kit including (i) an elongated extender and (ii) a stabilizer, securing the elongated extender to the valve, inserting the extender into the passageway of the stabilizer and securing the stabilizer into the access opening.

BRIEF DESCRIPTION OF THE DRAWINGS

A full understanding of the invention can be gained from the following description of the preferred embodiment when read in conjunction with the accompanying drawings in which.

DETAILED DESCRIPTION

Figure 1:
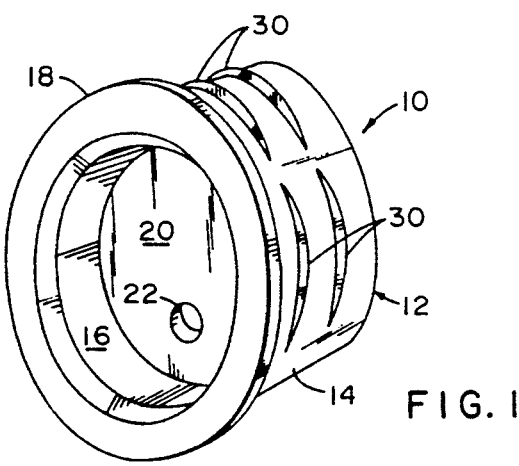
FIG. 1 is a perspective view of one embodiment of the tire valve stem stabilizer device.
Figure 2:
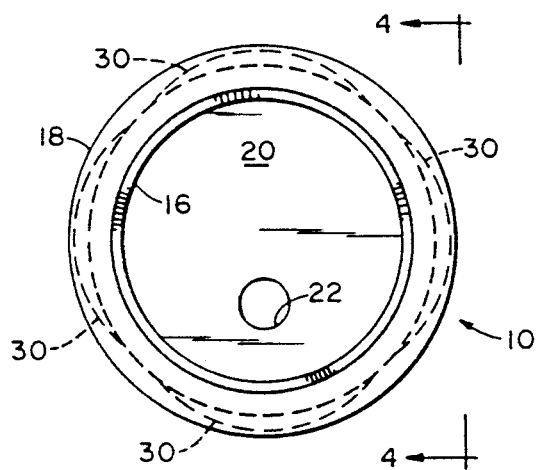
FIG. 2 is a top plan view of the device of FIG. 1.
Figure 3:
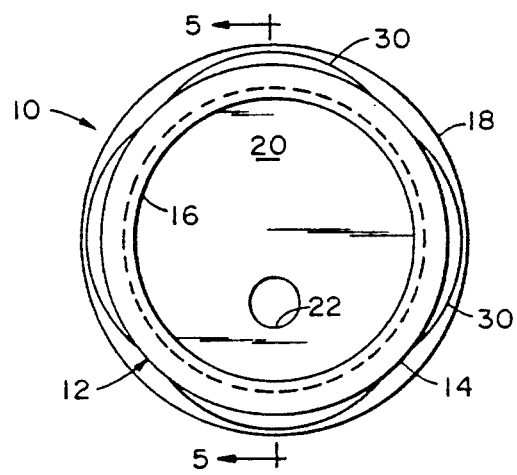
FIG. 3 is a bottom plan view of the device of FIG. 1.
Figure 8:
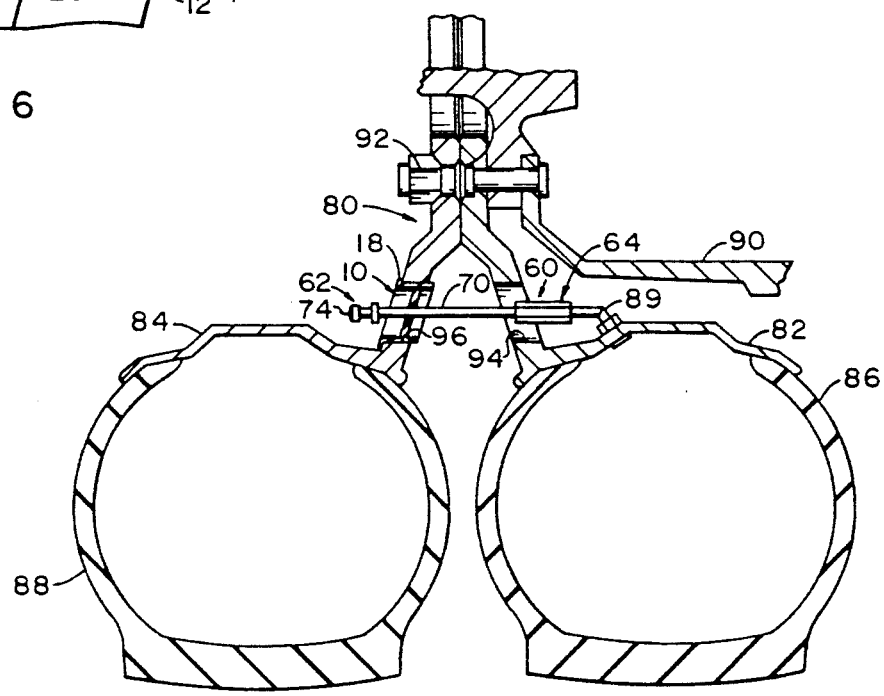
FIG. 8 is a cross-sectional view of the dual wheel system, showing the mounting of the tire valve stem extender to the valve stem of the inner tire as well as the mounting of the tire valve stem stabilizer in an access opening of the dual wheel.

Referring now to FIG. 1, a tire valve stem stabilizer 10 in accordance with the invention is shown. The tire valve stem stabilizer 10 shown in FIG. 1 is cylindrical in shape, however, it will be appreciated that the tire valve stem stabilizer 10 can be any shape that conforms to the access opening of the dual wheel in which the tire valve stem stabilizer 10 is mounted. Preferably, the tire valve stem stabilizer 10 is made of rubber or rubber compositions. The tire valve stem stabilizer 10 is preferably resilient so that it not only can be easily fitted into an access opening of a dual wheel but also so that it can be easily removed from the access opening of the dual wheel (FIG. 8).

The tire valve stem stabilizer 10 shown in FIG. 1 consists of a hollow cylindrical body 12 having an outer surface 14 and an inner surface 16. An annular lip 18 is disposed on one end of the cylindrical body 12. The annular lip 18 is adapted to engage the outer surface of the dual wheel system once the tire valve stabilizer 10 is placed in the access opening of the dual wheel system, as will be explained further hereinbelow with respect to FIG. 8.

As can be seen in FIGS. 1-5, the tire valve stem stabilizer 10 includes a cylindrical disc 20 having at least one circular passageway 22. The cylindrical disc 20 is mounted on the inner surface 16 of the hollow cylindrical body 12 of the tire valve stem stabilizer 10. The term "mounted on" as used herein can also include the disc being integrally formed with the body 12 of the tire valve stem stabilizer 10. In fact, the disc 20 is preferably integrally formed with hollow cylindrical body 12. As can be best seen in FIG. 5, the cylindrical disc 20 has a width $W_D$ that is preferably less than the width $W_B$ of the body 12 of the tire valve stem stabilizer 10, and the cylindrical disc 20 is disposed intermediately of the ends of the body 12. This structure provides balance and stability to the device, while at the same time minimizing the weight thereof.

Figure 4:
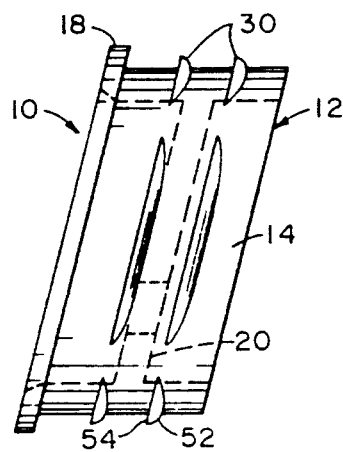
FIG. 4 is a side-elevational view, taken along line 4—4 of FIG. 2.
Figure 5:
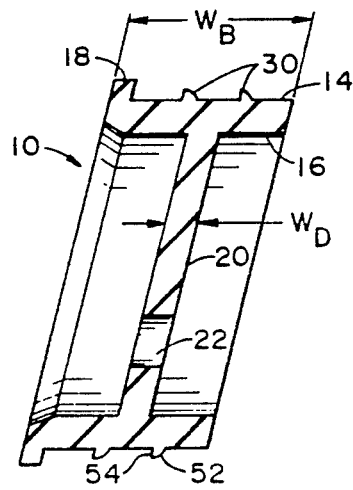
FIG. 5 is a cross-sectional view taken along line 5—5 of FIG. 3.

The passageway 22, as can be seen in FIG. 5, extends fully through disc 20. The passageway 22 is shown as being circular in cross-section, although it will be appreciated that any other shape of passageway 22 can be used. The shape of the passageway 22 is dictated by the cross-sectional shape of the tire valve stem or tire valve stem extender (see FIG. 7 and 8) with which the tire valve stem stabilizer 10 is used. It is preferred that the passageway 22 be shaped so as to frictionally engage the outer surface of the tire valve stem. In this way, the vibrations which can cause valve stem breakage can be eliminated or at least minimized. In the embodiment depicted in FIGS. 1-5, the passageway 22 is positioned off-center of the disc 20. In an alternate embodiment (not shown) the passageway may be positioned through the center of disc 20. The positioning of the passageway 20 is dictated by the angle formed between the valve stem and the dual wheel on which the tire is mounted.

As can be seen in FIGS. 4 and 5, the tire valve stem stabilizer 10 has a bevelled shape. This bevelled shape approximates the shape of the bevelled area of the dual wheel rim adjacent the circumference of the access opening. This will facilitate placing the tire valve stem stabilizer 10 in the access opening of the dual wheel system as will be explained with respect to FIG. 8 hereinbelow. It will be appreciated that the tire valve stem stabilizer 10 can have other geometric shapes depending on the shape of access opening of the dual wheel in which it is used.

Figure 6:
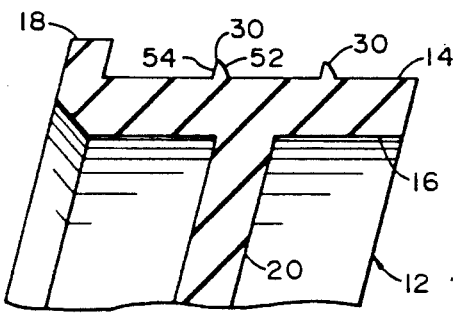
FIG. 6 is an enlarged view of a portion of FIG. 5 showing the profile of the projections on the device.

Referring now to FIGS. 1 and 4-6, the outer surface 14 of the hollow cylindrical body 12 has disposed thereon radially extending projections 30. The projections 30 shown in these figures are arranged in two axially spaced rows and are formed as discontinuous bands. It will be appreciated that the projections can include single or multiple annular bands which can be continuous or discontinuous. These radially extending projections 30 will facilitate inserting and securing the tire valve stem stabilizer 10 into the access opening of the dual wheel system. As can be seen in FIGS. 4-6, each projection 30 has a cross-sectional shape consisting of leading edge portion 52 and a trailing edge portion 54. The leading edge portion 52 has a ramped surface whereas the trailing edge portion 54 extends generally perpendicularly from the outer surface 14 of the body 12. The tire valve stem stabilizer 10 is placed into the access opening of the dual wheel system leading edge portion 52 first. The ramped surface of the leading edge portion 52 facilitates inserting the tire valve stem stabilizer 10 into the access opening of the dual wheel system. Once the tire valve stem stabilizer 10 is in place in the access opening of the dual wheel system, the trailing edge portion 54 provides additional frictional securement support for the tire valve stem stabilizer 10 in the access opening.

Figure 7:
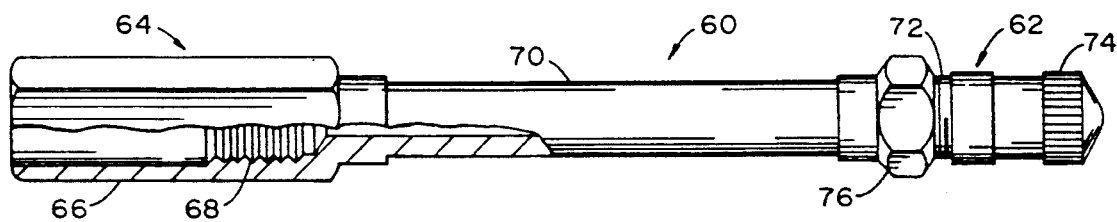
FIG. 7 is a side elevational view, partially in cross-section, of the tire valve stem extender.

Referring now to FIG. 7, an elongated tire valve stem extender 60 which can be used in operative association with the tire valve stem stabilizer 10 is shown. The extender 60 consists of a valve end 62 and tire valve stem engagement end 64. The tire valve stem engagement end 64 includes collar 66 having valve threads 68 disposed on the inner surface thereof. The collar 66 extends beyond the valve threads 68 so as to provide extra support in the area where the valve extender 60 most likely tends to break. A hollow valve extender body 70 extends between the valve end 62 and the tire valve stem engagement end 64. The body 70 allows the passage of air from the valve end 62, via the valve 72 to the tire valve stem on the inner tire mounted on the dual wheel system. The tire valve stem extender 60 is also provided with a conventional valve cap 74 to cover the valve 72 and a wrench engagement collar 76 to facilitate installing the tire valve extender 60 on a tire valve.

The tire valve stem stabilizer 10 and the tire valve stem extender 60 can be provided as a kit. The kit can be used in operative association with the tire valve stem of the inner tire mounted on a dual wheel system as is shown in FIG. 8. Referring now to FIG. 8, a dual wheel system 80 is shown which includes an inner rim 82 and an outer rim 84 which have mounted thereon respectively an inner tire 86 and an outer tire 88. Each tire includes a tire valve stem, only one of which, inner tire valve stem 89 is shown. The dual wheel system 80 is mounted to the truck body 90 by means of a plurality of lugs, one of which, lug 92, is shown in cross-section in FIG. 8. The inner rim 82 and the outer rim 84 define access openings 94 and 96, respectively.

As can be seen in FIG. 8, the tire valve stem stabilizer 10 is positioned in access opening 96 of the outer rim 84 of the dual wheel system 80. The annular lip 18 of the tire valve stem stabilizer 10 engages the outer surface of the outer rim 84 of the dual wheel system 80 in order to provide a secure fit of the tire valve stabilizer 10 in the access opening 96. As can also be seen, the tire valve stem stabilizer 10 is shaped so as to correspond substantially with the shape and size of the access opening 96, which in this case is bevelled.

The tire valve stem extender 60 is secured at the valve engagement end 64 to the inner valve step 89. The body 70 of the tire valve stem extender 60 passes through access opening 94 of the inner rim 82 and through passageway 22 (not shown in FIG. 8) of the tire valve step stabilizer 10. The extender 60 frictionally engages the disc 20 of the tire valve stem stabilizer 10 in order to support the tire valve stem extender 60 in the access opening 96 and to resist the tire valve stem extender 60 from forcibly contacting the sides of the dual rims defined by the access opening in response to shocks and vibrations sustained in operation of the vehicle of which the dual wheel system is a part.

The invention contemplates use of the tire valve stem stabilizer 10 without the use of the tire valve stem extender 60. That is, the inner tire may already be equipped with an elongated tire valve stem with which the tire valve stem stabilizer 10 can be used.

The invention also includes a method of providing access to a valve of an inner tire mounted on a dual wheel system including a dual wheel having an access opening as is shown in FIG. 8. The method includes providing a tire valve stem stabilizer 10 having a passageway 22 which is first placed into the access opening 96 of a dual wheel system 80. After this, an elongated tire valve stem (not shown in FIG. 8) or an elongated tire valve stem extender 60 is inserted into the passageway 22 of the tire valve stem stabilizer 10 in order to stabilize and support the extender 60 therein. Alternatively, the elongated tire valve stem or the tire valve stem extender 60 can be first inserted into the passageway 22 of the tire valve stem stabilizer 10, with the tire valve stem stabilizer 10 then being secured into the access opening 96 of the dual wheel system.

It will be appreciated that the invention has provided a unique tire valve stem stabilizer that is used in association with an elongated valve stem or an elongated valve stem extender mounted on the inner tire of a dual wheel system.

While the invention has been described in terms of preferred embodiments, the claims appended hereto are intended to encompass all embodiments which fall within the spirit of the invention.

What is claimed is:

1. A resilient device for insertion into an access opening through a dual wheel, having a bevelled area adjacent the circumference of the access opening, to support an elongated valve stem means which projects through said opening, said device comprising a tubular body portion adapted to be easily removably secured in said access opening in said dual wheel, wherein said tubular body portion has a bevelled shape substantially corresponding to the shape of said access opening and including means for frictional securement in said access opening, said tubular body portion further having an outer end with an radially outwardly projecting lip thereon for engaging a wheel adjacent said access opening and having resilient means projecting inwardly from said tubular body portion for supporting said elongated valve stem means, said resilient means having a width less than the width of said tubular body portion, whereby said device can be easily positioned on said valve stem means and inserted into said access opening to support said valve stem means intermediate its ends.

2. The device of claim 1, wherein
said resilient means has a passageway therethrough for receiving said elongated valve stem means.

3. The device of claim 2, wherein
said device is generally cylindrical in cross-section and has an outer circumferential surface with radially extending projections disposed thereon.

4. The device of claim 3, wherein
said projections have a lead portion and a trailing portion;
said lead portion has a ramped surface to facilitate inserting said device into said access opening; and
said trailing portion extends generally perpendicularly from said outer circumferential surface so as to facilitate maintaining said device securely in said access opening once it is mounted therein.

5. The device of claim 4, wherein
said projections are a plurality of axially spaced bands.

6. The device of claim 5, wherein
said bands are discontinuous.

7. The device of claim 1, wherein
said elongated valve stem means includes a valve stem extender secured to said valve stem means.

8. The device of claim 1, wherein said
tubular body portion has an outer surface and an inner surface; and
said resilient means comprises a wall which defines a passageway therethrough, said wall being integral with said body portion.

9. The device of claim 1, wherein
said device is made of rubber.

10. A resilient device as set forth in claim 1 in which said inwardly projecting means comprises a disc portion disposed transversely of said body portion and having a passageway therethrough.

11. A tire valve stem extender and stabilizer kit for use with a dual wheel assembly having inner and outer rims which include a valve stem on said inner rim and an access opening in said outer rim to allow access to the valve stem of said inner rim, said kit comprising:
an elongated extender means having an end portion adapted for engagement with said valve stem and further adapted for insertion at least partially through said access opening; and
resilient stabilizer means which includes a tubular body portion having means for frictional securement in said access opening and an outer end with a radially outwardly projecting lip on it and having an inwardly projecting resilient means with a passageway therethrough in which said elongated extender means is adapted to be inserted, said projecting means having a width less than the width of said tubular body portion;
said stabilizer means adapted to be removably secured in said access opening with at least a portion of said extender means projecting therethrough, whereby said elongated extender means is stabilized and supported in said access opening intermediate the ends of said extender means.

12. The kit of claim 11, wherein
said elongated extender means includes a tube-shaped collar disposed on said end portion adapted for engagement with said valve stem, said collar being adapted to support to at least a portion of said valve stem.

13. The kit of claim 12, wherein
said collar having one end section engaging said inner tire valve engagement end portion and a second section extending axially from said inner tire valve engagement end portion, said second section defining an internal aperture adapted for engagement with said inner tire valve.

14. The kit of claim 13, wherein
said elongated extender means has a free end opposite of said inner tire valve engagement end portion, said free end including a valve adapted to be engaged by a pressurized air source.

15. The kit of claim 14, wherein
said free end includes a wrench engagement section.

16. The kit of claim 15, including
valve cap means for covering said elongated extender means valve.

17. A kit as set forth in claim 11 in which said stabilizer means comprises a generally cylindrical hollow body portion and an integral disc portion disposed transversely in said hollow body portion, and said passageway is through said disc portion.

18. A kit as set forth in claim 17 in which said stabilizer is made of rubber.

19. A kit as set forth in claim 17 in which said hollow body portion has an outer surface generally corresponding with the shape of said access opening.

20. A kit as set forth in claim 19 in which said outer surface has outwardly extending projections on it for engaging said access opening.

21. A tire valve stem extender and stabilizer kit for use with a dual wheel assembly having inner and outer rims which include a valve stem on said inner rim and an access opening in said outer rim to access said valve stem, said kit comprising:
an elongated extender means having an end portion adapted for engagement with said valve stem and further adapted for insertion at least partially through said access opening; and a rubber stabilizer having a generally cylindrical hollow body portion which includes means for frictional securement of the stabilizer in said access opening, an outer end having a radially outwardly projecting lip on it, and an integral disc portion disposed transversely in said body portion, said disc portion having a width less than the width of said body portion and further having a passageway therethrough in which said elongated extender means is adapted to be inserted;

said stabilizer means adapted to be secured in said access opening with said extender means projecting therethrough, whereby said elongated extender is stabilized and supported in said access opening.

* * * * *